US012430496B2

(12) United States Patent
Tsuzuku et al.

(10) Patent No.: US 12,430,496 B2
(45) Date of Patent: Sep. 30, 2025

(54) ITERATIVELY UPDATING A DOCUMENT STRUCTURE TO RESOLVE DISCONNECTED TEXT IN ELEMENT BLOCKS

(71) Applicant: INTERNATIONAL BUSINESS MACHINES CORPORATION, Armonk, NY (US)

(72) Inventors: Daiki Tsuzuku, Kawasaki (JP); Shunsuke Ishikawa, Shinjuku-ku (JP); Yasumasa Kajinaga, Funabashi (JP); Masaki Komedani, Yokohama (JP); Keisuke Nitta, Koshigaya (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 17/534,610

(22) Filed: Nov. 24, 2021

(65) Prior Publication Data

US 2023/0161948 A1    May 25, 2023

(51) Int. Cl.
*G06F 40/16* (2020.01)
*G06F 16/3332* (2025.01)
(Continued)

(52) U.S. Cl.
CPC ........ *G06F 40/166* (2020.01); *G06F 16/3334* (2019.01); *G06F 40/20* (2020.01); *G06V 30/414* (2022.01); *G06V 30/416* (2022.01)

(58) Field of Classification Search
CPC .... G06F 40/166; G06F 16/3334; G06F 40/20; G06F 40/151; G06F 40/131; G06F 40/30; G06V 30/414; G06V 30/416
See application file for complete search history.

(56) References Cited

U.S. PATENT DOCUMENTS 7,046,847 B2    5/2006 Hurst et al.
8,504,553 B2    8/2013 Vailaya et al.
(Continued)

FOREIGN PATENT DOCUMENTS

CN    107861954    3/2018
CN    110147544    8/2019
(Continued)

OTHER PUBLICATIONS

Mell et al., "The NIST Definition of Cloud Computing", NIST, Special Publication 800-145, Sep. 2011, 7 pages.
(Continued)

*Primary Examiner* — Mark Villena
(74) *Attorney, Agent, or Firm* — Rakesh Roy; Andrew D. Wright; Calderon Safran & Wright P.C.

(57) ABSTRACT

A system and method iteratively update a determined structure of a digital document file to remediate disconnected text in blocks of the determined structure. In embodiments, a method includes determining a structure of a digital document file using a document understanding analysis, the structure including blocks of elements having text information; determining for each of the blocks of the digital document file whether text information in the block is disconnected; determining an order of the blocks in the digital document file; pairing two blocks from a list of blocks with disconnected text information to form a block pair, wherein the two blocks are ordered based on the determined order of the blocks; determining that the text information of the block pair forms a complete sentence using natural language processing; and consolidating the block pair to form a new block.

20 Claims, 8 Drawing Sheets

(51) Int. Cl.
*G06F 40/166* (2020.01)
*G06F 40/20* (2020.01)
*G06V 30/414* (2022.01)
*G06V 30/416* (2022.01)

(56) References Cited

U.S. PATENT DOCUMENTS

| | | | |
|---|---|---|---|
| 10,929,609 B1 | 2/2021 | Mitchell | |
| 11,947,916 B1* | 4/2024 | Agarwal | G06N 20/00 |
| 2008/0260241 A1* | 10/2008 | Ye | G06F 40/171 |
| | | | 382/159 |
| 2013/0226559 A1* | 8/2013 | Lim | G06F 16/9535 |
| | | | 704/9 |
| 2014/0281935 A1* | 9/2014 | Byron | G06F 40/177 |
| | | | 715/249 |
| 2015/0154308 A1* | 6/2015 | Hagg | G06F 16/338 |
| | | | 707/722 |
| 2017/0154031 A1* | 6/2017 | Krishnamurthy | G06N 5/04 |
| 2017/0337180 A1 | 11/2017 | Wang | |
| 2018/0246856 A1* | 8/2018 | Kataoka | G06F 40/289 |
| 2018/0300311 A1 | 10/2018 | Krishnamurthy | |
| 2019/0205391 A1* | 7/2019 | Dobrynin | G06F 9/454 |
| 2020/0210525 A1 | 7/2020 | Yang et al. | |
| 2020/0272648 A1 | 8/2020 | Hasegawa et al. | |
| 2020/0387531 A1 | 12/2020 | Agnihotram et al. | |
| 2021/0073216 A1 | 3/2021 | Chang | |
| 2021/0192126 A1* | 6/2021 | Gehrmann | G06N 20/00 |
| 2021/0256160 A1* | 8/2021 | Hachey | G06N 20/00 |
| 2022/0138432 A1* | 5/2022 | Galitsky | G06F 40/211 |
| | | | 704/9 |
| 2022/0164549 A1* | 5/2022 | Gupta | G06F 40/56 |
| 2022/0382982 A1* | 12/2022 | Orbach | G06F 16/2468 |

FOREIGN PATENT DOCUMENTS

| | | |
|---|---|---|
| CN | 111813802 | 10/2020 |
| JP | 5151449 | 2/2013 |
| JP | 2013137702 | 7/2013 |
| WO | 2003046765 | 6/2003 |
| WO | 2023/093259 A1 | 6/2023 |

OTHER PUBLICATIONS

Horev, "BERT Explained: State of the art language model for NLP", https://towardsdatascience.com/bert-explained-state-of-the-art-language-model-for-nlp-f8b21a9b6270, Nov. 10, 2018, 8 pages.
International Search Report and Written Opinion for PCT/CN2022/120959 dated Dec. 16, 2022; 9 Pages.

* cited by examiner

ITERATIVELY UPDATING A DOCUMENT STRUCTURE TO RESOLVE DISCONNECTED TEXT IN ELEMENT BLOCKS

BACKGROUND

Aspects of the present invention relate generally to document structure analysis and, more particularly, to iteratively updating blocks in a document structure to resolve disconnect text within the blocks.

In the technical field of automated document processing, the term document layout analysis generally refers to the process of identifying and categorizing regions of interest in a scanned image of a text document. A reading system requires the segmentation of text zones from non-textual ones and the arrangement in their correct reading order. Detection and labeling of different blocks (or zones) as text, illustrations, symbols, etc., is generally called geometric layout analysis. Logical layout analysis is used to apply semantic labeling to different zones. Document layout analysis generally is concerned with both geometric and logical labeling.

The terms "smart document understanding" (SDU) or "document understanding" generally refer to computer processes that use artificial intelligence (AI) models to automate classification of files and extraction of information. In one example, an SDU tool is configured to extract text from digital documents in a variety of formats, including portable document format (PDF), word processing, and image formats, by converting a document (e.g., JPEG) into a PDF file, analyzing a document structure of the converted PDF file to divide it into individual elements, and obtain geometric information (e.g., position, size and order) of each element in the converted document. Additionally, the SDU tool consolidates continuous elements from the document structure to create blocks (e.g., zones) and extracts text from the blocks or uses Optical Character Recognition (OCR) in the case of an embedded image to extract the text.

SUMMARY

In a first aspect of the invention, there is a computer-implemented method including: determining, by a computing device, a structure of a digital document file using a document understanding analysis, the structure including blocks of content elements having text information; determining, by the computing device, for each of the blocks of the digital document file, whether text information in the block is disconnected using natural language processing; determining, by the computing device, an order of the blocks in the digital document file; pairing, by the computing device, two blocks from a list of blocks with disconnected text information to form a block pair, wherein the two blocks are ordered based on the determined order of the blocks; determining, by the computing device, that the text information of the block pair forms a complete sentence using natural language processing; and consolidating, by the computing device, the block pair to form a new block.

In another aspect of the invention, there is a computer program product including one or more computer readable storage media having program instructions collectively stored on the one or more computer readable storage media. The program instructions are executable to: determine for each of a plurality of blocks in a determined digital document file structure, whether text information in the block is disconnected using natural language processing, wherein the digital document file structure is stored in a data store; in response to determining that text information in at least some of the blocks is disconnected, pair two blocks from a list of blocks with disconnected text information to form a block pair, wherein the two blocks are ordered based on a determined order of the blocks in the digital document file structure; determine whether the text information of the block pair forms connected text information using natural language processing; generate a new block by consolidating the block pair in response to determining that the text information of the block pair form connected text information; and in response to generating the new block, automatically update the stored digital document file structure by replacing the two blocks with the new block.

In another aspect of the invention, there is system including a processor, a computer readable memory, one or more computer readable storage media, and program instructions collectively stored on the one or more computer readable storage media. The program instructions are executable to cause a computing device to: determine for each of a plurality of blocks in a determined digital document file structure, whether text information in the block is disconnected using natural language processing, wherein the digital document file structure is stored in a data store; in response to determining that text information in at least some of the blocks is disconnected, pair two blocks from a list of blocks with disconnected text information to form a block pair, wherein the two blocks are ordered based on a determined order of the blocks in the digital document file structure; determine whether the text information of the block pair forms connected text information using natural language processing; generate a new block by consolidating the block pair in response to determining that the text information of the block pair form connected text information; and in response to generating the new block, automatically update the stored digital document file structure by replacing the two blocks with the new block; and iteratively repeating the steps of determining whether text information in the block is disconnected, pairing two blocks, determining whether the text information of the block pair forms connected text information, generating a new block, and updating the stored structure, until the computing device determines that, for each of a plurality of blocks in a determined digital document file structure, no text information is disconnected.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to document structure analysis and, more particularly, to iteratively updating blocks in a document structure to resolve disconnect text within the blocks. Embodiments of the invention refine a determined structure of documents (e.g., PDF documents) using natural language processing (NLP) technology.

In embodiments, a method for connecting disconnected text information in a file is provided, the method including the steps of: analyzing and dividing the file containing text information into elements and consolidating continuous elements to create a plurality of blocks; obtaining the order of the plurality of blocks in the file; determining whether a sentence is disconnected for each of the blocks of the text information; selecting two blocks from a list of blocks with disconnected sentences, connecting text of the selected two blocks according to the obtained order, and determining, by NLP, whether the text is connected as a sentence or not; adding two blocks producing a connected sentence to pairs of candidates to be consolidated into one block; and consolidating a plurality of the pairs of candidates containing the same block(s) into one block according to the order.

Embodiments of the invention constitute an improvement in the technology field of automated digital document processing. Automated digital document processing is an area of technology that has become critical to certain processes, such as digital data mining, question and answer systems, and big data analysis. Various computing tools can be utilized in digital documents processing systems. For example, a variety of NLP tools are typically used in digital document processing. In general, NLP tools enable a computer to understand text and/or spoken words. One example of an NLP tool is optical character recognition (OCR), which is a technology that recognizes text within a digital image. NLP is a branch of AI that provides a technical solution to the problem of communication between machines and humans. Additionally, document understanding analysis tools may also be utilized to automate the classification of digital files and the extraction of information from the files. In general, document understanding analysis tools use artificial intelligence (AI) models to automate classification of files and extract of information.

Some document understanding analysis tools convert a digital document to a PDF formatted document, divide the PDF document into elements by analyzing the structure of the PDF document, obtain geometric information (e.g., position, size, and order) of each element, and consolidate continuous elements to create blocks. Text may then be extracted from the blocks (e.g., using OCR). However, the text derived from such tools may not be accurate, depending on the structure of the document. For example, in some document structures, the determined blocks are too far apart, and therefore, text which ought to be continuous structurally and semantically is disconnected by the document understanding analysis before being extracted. In this context, disconnected text means text which is not complete as a sentence or phrase. For example, "apply for a patent" is not disconnected whereas "apply" and "for a patent" are disconnected.

Advantageously, embodiments of the invention reinforce a correct document structure based on not only geometrical information of the document but also grammatical correctness and semantic continuity of text. Further, embodiments enable proper execution of NLP to business documents in various formats, resulting in enhanced automated document searching and improved accuracy of analysis. Embodiments of the invention are not restricted to business documents, and enable text extracted from various media such as image, video, and sound media.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
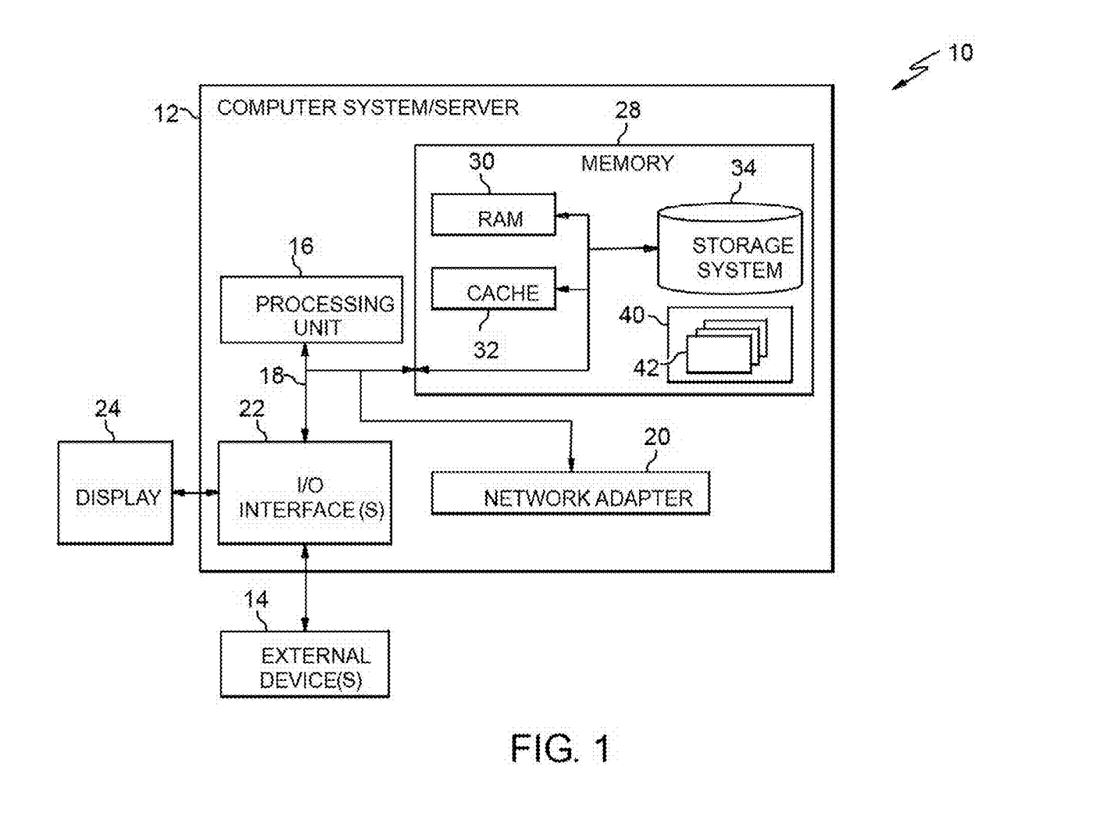
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
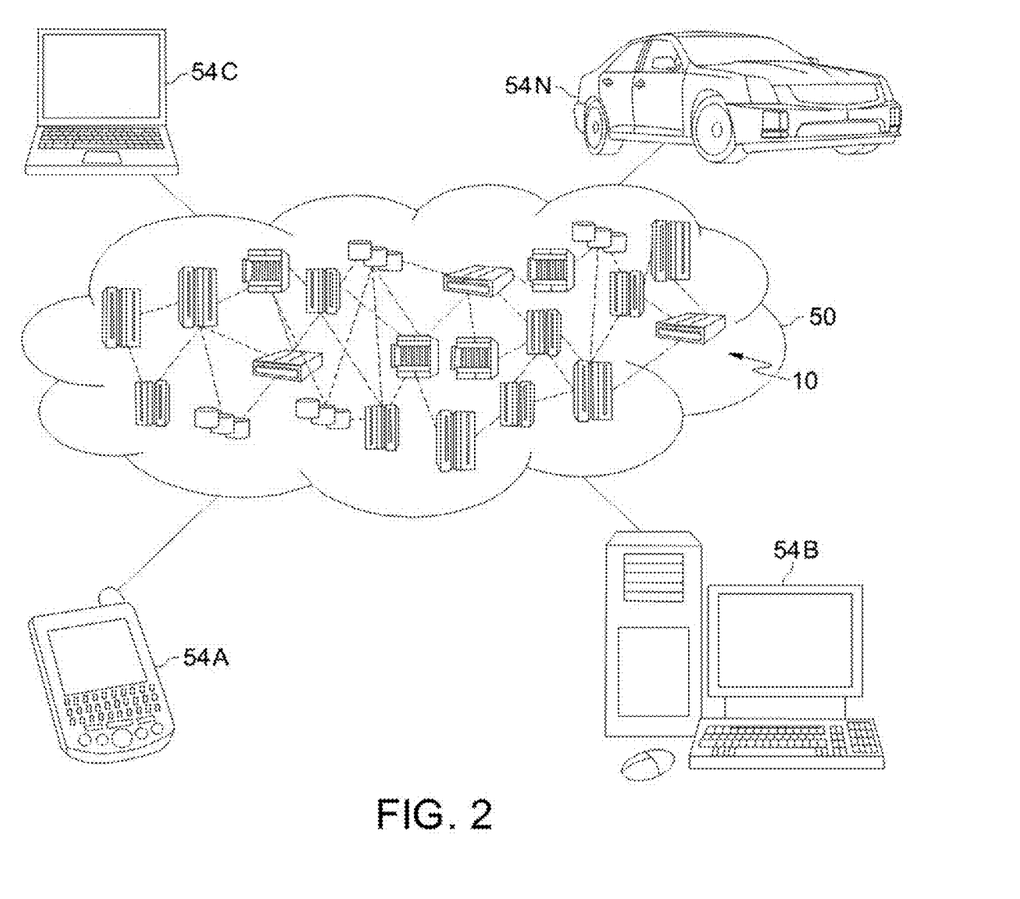
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
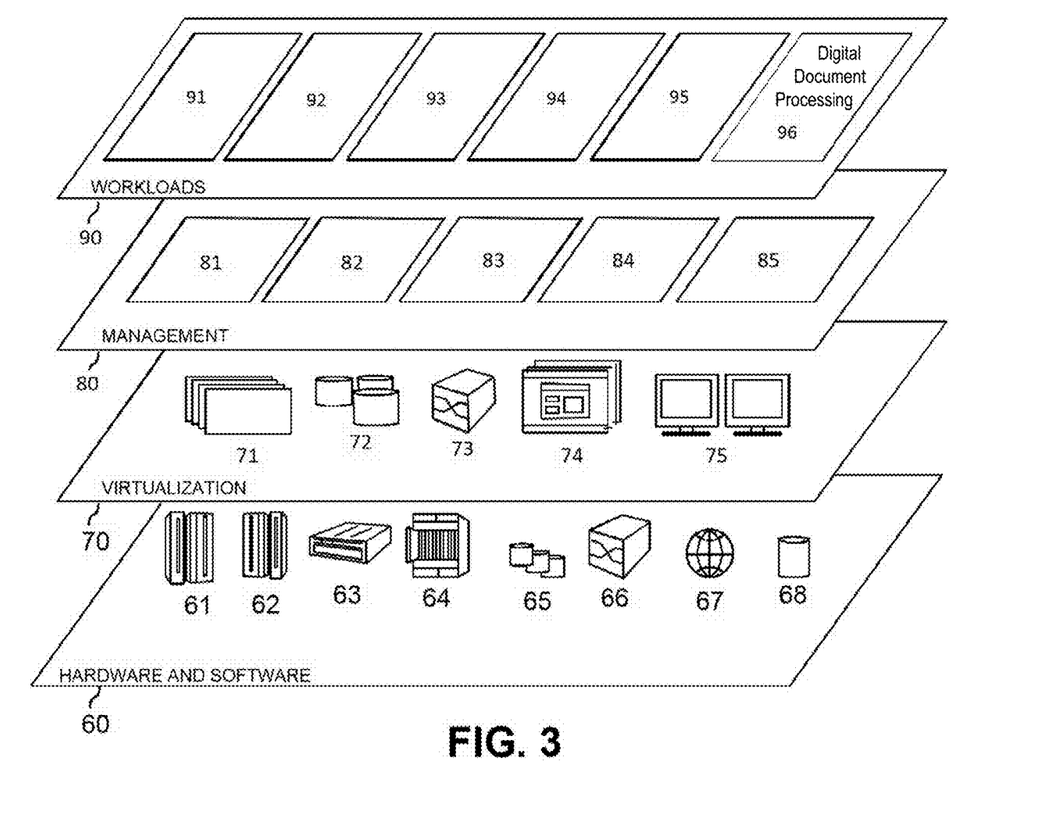
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital document processing 96.

Implementations of the invention may include a computer system/server 12 of FIG. 1 in which one or more of the program modules 42 are configured to perform (or cause the computer system/server 12 to perform) one of more functions of the digital document processing 96 of FIG. 3. For example, the one or more of the program modules 42 may be configured to: determine and store a structure of a digital document file using a document understanding analysis, the structure including blocks of elements having text information; determine an order of the blocks in the digital document file; determine for each of the blocks of the digital document file, whether text information in the block is disconnected using natural language processing; in response to determining that text information in at least some of the blocks is disconnected, pair two blocks from a list of blocks with disconnected text information to form a block pair, wherein the two blocks are ordered based on the determined order of the blocks; determine whether the text information of the block pair forms connected text information using natural language processing; generate a new block by consolidating the block pair in response to determining that the text information of the block pair form connected text information; in response to generating the new block, update the stored structure of the digital document file by replacing the two blocks with the new block; and repeating the above-identified steps to iteratively update the stored structure of the digital document file until it is determined that for each of the blocks of the digital document file, no text information is disconnected.

Figure 4:
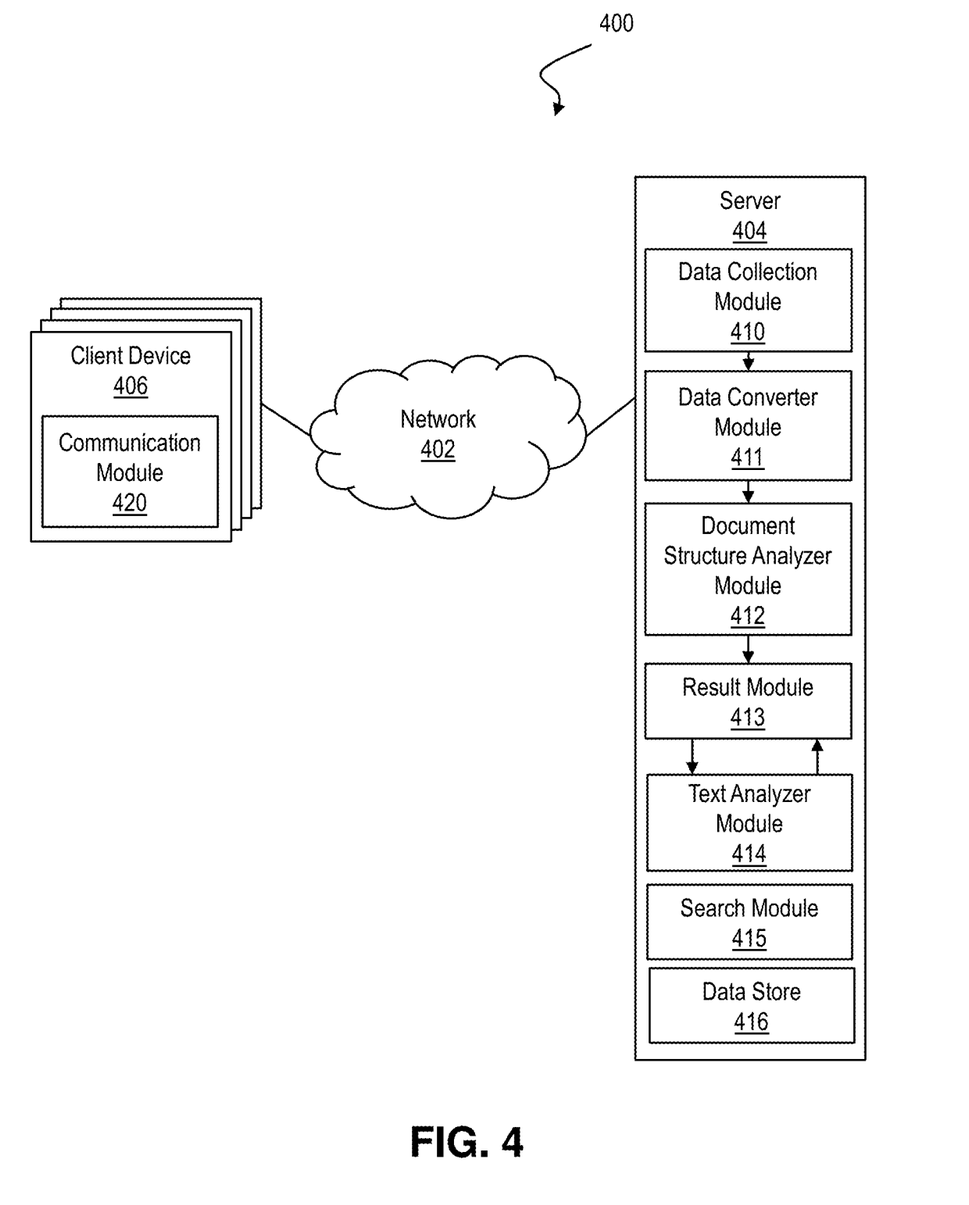
FIG. 4 shows a block diagram of an exemplary environment in accordance with aspects of the invention.

FIG. 4 shows a block diagram of an exemplary digital document processing environment 400 in accordance with aspects of the invention. In embodiments, the digital document processing environment 400 includes a network 402 enabling communication between a server 404 and one or more client devices represented at 406. The server 404 and the client devices 406 may each comprise the computer system/server 12 of FIG. 1, or elements thereof. The server 404 may comprise a computing node 10 in the cloud computing environment 50 of FIG. 2. In embodiments, the one or more client devices 406 comprise local computing devices used by cloud consumers (e.g., cellular telephone 54A, desktop computer 54B, laptop computer 54C) in the cloud computing environment 50 of FIG. 2.

In embodiments, the server 404 includes one or more modules enabling a document understanding analysis, each of which may comprise one or more program modules such as program modules 42 described with respect to FIG. 1. In implementations, the term document understanding analysis refers to the use AI models to automate classification of files and extract of information. In the example of FIG. 4, the server 404 includes a data collection module 410 configured to obtain digital documents (e.g., from one or more communication modules 420 of client device 406); a data converter module 411; a document structure analyzer module 412; a result module 413; a text analyzer module 414; and a search module 415 (wherein each module may comprise one or more program modules 42 described with respect to FIG. 1).

In implementations, data collection module 410 collects digital documents (e.g., business documents), from one or more sources (e.g., client devices 406), and stores the documents in a remote or local data store (e.g., local data store 416). In embodiments, the data converter module 411 is configured to convert the digital documents collected by the data collection module 410 into a desired format, as necessary. For example, in implementations, the data converter module 411 converts digital documents into a PDF format.

In embodiments, the document structure analyzer module 412 is configured to analyze the collected digital documents (e.g., in PDF form) using document understanding analysis tools. In implementations, the document structure analyzer module 412 is configured to analyze a structure of each digital document, divide the document into individual elements, and analyze the document for geometric information (e.g., position, size, and order) for each element. Various tools and methods may be utilized to determine elements of digital documents and obtain geometric information. In implementations, document structure analyzer module 412 further consolidates continuous elements to create blocks of content, and extracts text information from the blocks of content (e.g., using OCR). In embodiments, the document structure analyzer module 412 further determines an order (of blocks in consecutive order from a first block to a last block.

In implementations, the result module 413 is configured to obtain and save results from the documents structure analyzer module 412. For example, the result module 413 may store blocks of data and their associated text information in the data store 416. In embodiments, the text analyzer module 414 is configured to obtain the results from the result module 413, and determine whether the text information for the blocks comprise disconnected text (e.g., incomplete sentences). The text analyzer module 414 is further configured to resolve disconnected text by consolidating blocks according to the predetermined order of blocks (a unidirectional order) and determining whether consolidating the blocks results in connected text (e.g., a complete sentence or phrase), and updating the result module 413 to replace blocks of disconnected text with one or more consolidated blocks.

In embodiments, the search module 415 is configured to access results in the data store 416 during search-related activity. For example, a user accessing a graphical user interface provided by the server 404 may enter a keyword into a search box, and the server 404 may determine results that match the keyword, including one or more blocks of data (including complete sentences) from the data store 416, which were derived from the collected digital documents.

The server 404 and one or more client devices 406 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment may include additional devices and/or networks; fewer devices and/or networks; different devices and/or networks; or differently arranged devices and/or networks than illustrated in FIG. 4.

Figure 5A:
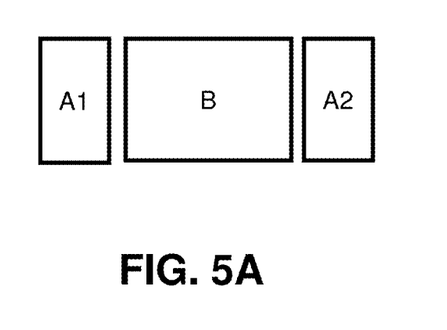
FIGS. 5A-5C depict exemplary document structures having arrangements of elements that results in blocks of disconnected text information.
Figure 5B:
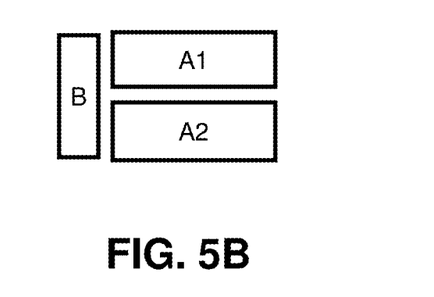
Figure 5C:
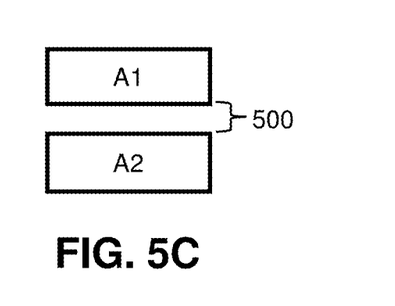

FIGS. 5A-5C depict exemplary document structures having arrangements of elements that results in blocks of disconnected text information. More specifically, FIG. 5A depicts a first exemplary document structure, wherein portions of text in block A1 and block A2 combine to form a complete text phrase (e.g., a complete sentence). In this example, a first portion of the complete text phrase is recognized by a document understanding analysis tool as a single block A1 due to its separation from a second portion of the complete text phrase in block A2 by an image in block B.

FIG. 5B depicts a second exemplary document structure, wherein portions of text in block A1 and block A2 combine to form a complete text phrase (e.g., a complete sentence). In this example, processing of the document structure results in a first portion of the complete text phrase being recognized as block A1, and a second portion of the complete text phrase being recognized as a block A2 due to the position of content in block B, which extends along the content of both block A1 and block A2.

FIG. 5C depicts a third exemplary document structure, wherein portions of text in block A1 and block A2 combine to form a complete text phrase (e.g., a complete sentence). In this example, a space 500 between content in block A1 and content in block A2 causes a document understanding analysis tool to identify content in block A1 as a separate element(s) from content in block A2.

Figure 6:
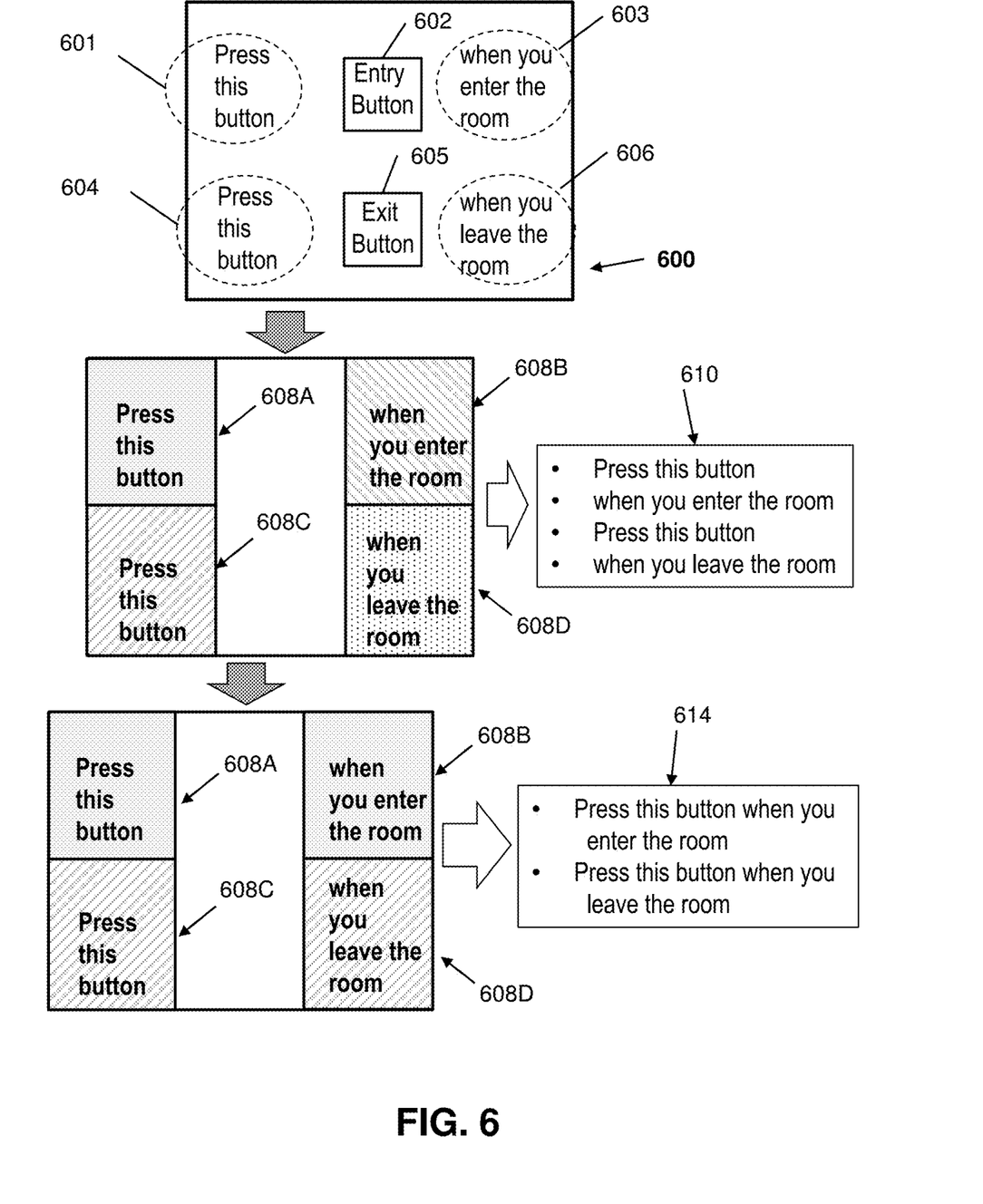
FIG. 6 is a diagram comparing a first set of results from a document understanding tool, and a second set of results from a document understanding tool enhanced with block consolidation methods in accordance with aspects of the invention.

FIG. 6 is a diagram comparing a first set of results from a document understanding analysis tool, and a second set of results from a document understanding analysis tool enhanced with block consolidations methods in accordance with aspects of the invention.

In the example of FIG. 6, a digital document 600 includes a structure wherein sentences are fragmented. In this example, a document understanding analysis tool analyzes the structure of the digital document 600, and determines elements 601-606. In this case, a first portion of text 601 "Press this button" is separated from a second portion of text 603 "when you enter the room" by an image 602 including the text "Entry Button." Similarly, a third portion of text 604 "Press this button" is separated from a fourth portion of text 606 "when you leave the room" by an image 605 including the text "Exit Button." The document understanding analysis tool identifies the elements as separate blocks with text 608A-608D. Upon text analysis of the blocks (e.g., using OCR), the document understanding analysis tool generates results 610 comprising four different blocks of disconnected text: "Press this button", "when you enter the room", "Press this button", and "when you leave the room.

In accordance with embodiments of the invention, a document understanding analysis tool (e.g., document structure analyzer module 412) analyzes the structure of the digital document 600, determines elements 601-606, and identifies them as separate blocks with text 608A-608B. In this case, the order of text elements is also determined as: 601, 603, 604, 606. Additionally, the text analyzer module 414 generates pairs of blocks (e.g., 608A/608B; 608C/608D) based on the order of text elements, and conducts an AI NLP analysis of the block pairs to determine whether the block pairs result in connected phrases. In this example, the results 614 generated according to embodiments of the invention including two blocks of connected text (e.g., whole sentences): "Press this button when you enter the room" and "Press this button when you leave the room."

Figure 7:
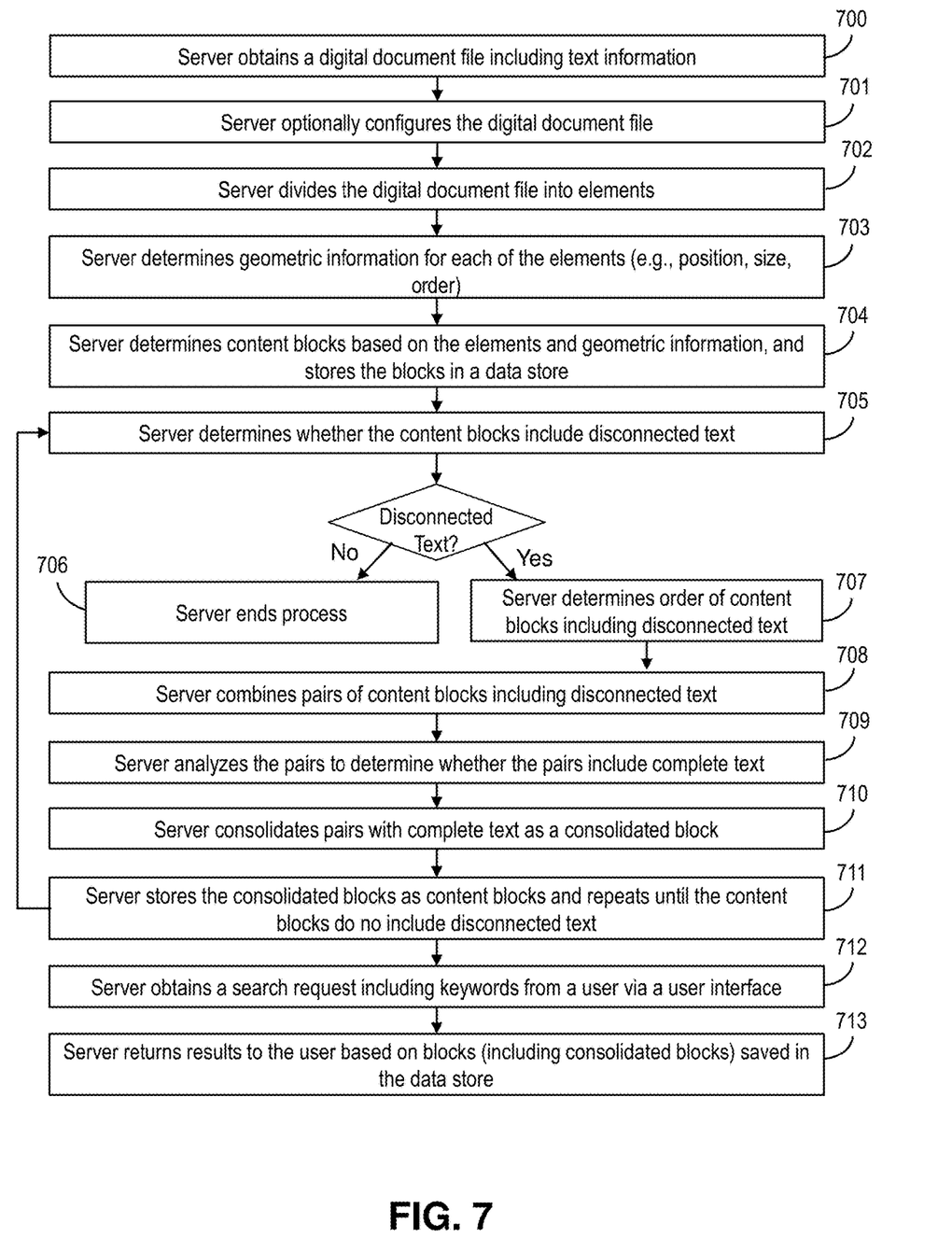
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 700, the server 404 obtains a digital document file including text information. In implementations, the data collection module 410 of the server 404 collects the digital document file from a remote source (e.g., client device 406) or from a local source (e.g., data store 416).

At step 701, the server 404 optionally configures the digital document file. In one example, the server 404 converts the digital document file to a PDF file, as necessary (e.g., from a JPEG file). In embodiments, the data converter module 411 of the server 404 implements step 701.

At step 702, the server 404 divides the digital document file into elements. Elements may include, for example, headers, footers, sections, articles, asides, titles, images, etc. The server 404 may determine elements based on predetermined rules using document layout analysis tools. Various methods of determining elements may be utilized by the server 404, and embodiments of the invention are not intended to be limited to a particular method of determining elements of a digital document file. In embodiments, the document structure analyzer module 412 of the server 404 implements step 702.

At step 703, the server 404 determines geometric information for each element of the digital document file. Geometric information may include the position of the element in the document, the size of the element and the order of the elements, of example. Various tools and methods for determining geometric information may be utilized, and the invention is not intended to be limited to any particular tool or method. In embodiments, the document structure analyzer module 412 of the server 404 implements step 703.

At step 704, the server 404 determines content blocks based on the elements and the geometric information, and stores the content blocks in a data store (e.g., data store 416). A content block may include one or more elements and may be determined based on stored rules. Various methods and tools may be utilized to determine content blocks, and the invention is not intended to be limited to any particular tool or method. In embodiments, the document structure analyzer module 412 of the server 404 implements step 704.

At step 705, the server 404 determines whether one or more of the content blocks include disconnected text. In implementation, the server 404 adds one or more content blocks including disconnected text to a list of blocks containing disconnected text. The term disconnected text as used herein refers to an incomplete sentence or phrase. In implementations, the server 404 utilizes AI NLP tools to determine whether the one or more content blocks include disconnected text. Various NLP methods and tools may be utilized to detect disconnected text, and the invention is not intended to be limited to any particular tool or method. In one example, the server 404 constructs a syntax tree by syntax analysis, and in the event of failure to construct the syntax tree, determines that the text in a content block is strange grammatically and therefore disconnected. In another example, an AI language model is trained to calculate the probability that words in text are arranged adjacent to each other in a sentence or phrase. If the probability falls below an established threshold value, the server 404 determines that the text is highly likely to be abnormal, and is therefore disconnected. In another example, the server 404 performs an adjacent text prediction using an artificial neural network, and if the prediction result is negative, the text is determined to be disconnected.

In general, an artificial neural network uses a collection of nodes or artificial neurons, wherein each artificial neuron receives a signal which it processes, and then signals artificial neurons connected to it. The signal at a connection is a real number, and the output of each neuron is computed by some non-linear function of the sum of its inputs. The connections are called edges, and weights of the artificial neurons and edges may be adjusted as the artificial neural network learns or is trained. Artificial neurons may be aggregated into layers, and different layers may perform different transformations on their inputs. One example of a neural network prediction model is Bidirectional Encoder Representations from Transformers (BERT) by Google®. It should be understood that trained artificial neural networks utilized herein are special computing tools that do not equate with any mental or manual process. In embodiments, the text analyzer module 414 of the server 404 implements step 705.

At step 706, in response to determining that the content blocks do not include disconnected text (e.g., the list of blocks containing disconnected text is empty), the server 404 ends the process. In embodiments, the text analyzer module 414 of the server 404 implements step 706.

At step 707, in response to determining that the content blocks do include disconnected text, the server 404 determines an order of the content blocks including disconnected text. In implementations, the server 404 uses predetermined rules to determine the order of content blocks from first to last, wherein the order is uni-directional. In implementations, the server 404 determines the order of the content blocks including disconnected text using information from a structural analysis of the digital file document (e.g., during step 703). In embodiments, the text analyzer module 414 of the server 404 implements step 707.

At step 708, the server 404 combines pairs of content blocks including disconnected text. In implementations, the server 404 combines pairs of content blocks based on the determined order at step 707. The following rules may be applied to blocks A-C having disconnected text: (1) A-B and A-C: select one with B or C closer to A in the order; (2) A-C and B-C: select one with A or B closer to C in the order; and (3) A-B and B-C: consolidate in the order from A to B to C. In one example, blocks are extracted from the digital file document during a structural analysis of the document in the order from A to B, and therefore, blocks are connected according to text of A+text of B, not text of B+text of A. In embodiments, the text analyzer module 414 of the server 404 implements step 708.

At step 709, the server 404 analyzes the pairs of content blocks to determine whether combining the text from the respective content blocks results in connected text. The term connected text as used herein refers to a complete sentence or phrase. In aspects of the invention, the server 404 connects text from each content block of the pairs of blocks prior to analyzes the connected text with an NLP tool. In embodiments, the text analyzer module 414 of the server 404 implements step 709.

At step 710, in response to determining that a pair of content blocks results in connected text, the server 404 consolidates the pair of content blocks into a single consolidated block or new block. In contrast, if no pairs of content blocks result in connected text, and all pairs of content blocks having unconnected text have been analyzed, the server 404 ends the process at step 709. In implementations, when the combination of content blocks results in text that is not disconnected, these two blocks become candidates to be consolidated into one block, and the server 404 only determines to consolidate a pair of content blocks into a single consolidated block when the pair of blocks is ordered consistent with the ordering of the blocks from first to last at step 707 (e.g., A→B, not B→A). In embodiments, the text analyzer module 414 of the server 404 implements step 710.

At step 711, the server 404 saves all consolidated blocks as content blocks in a data store (e.g., data store 416), and iteratively repeats steps 705-710 until the content blocks do not include disconnected text at 705, or the server does not identify any complete text at step 709. In implementations, the initial results of the document structure analyzer module 412 (e.g., blocks saved in the data store 416), are updated (replaced) with the consolidated blocks (new blocks). In embodiments, the text analyzer module 414 of the server 404 implements step 711.

At step 712, in implementations where the server 404 provides search functionality, the server obtains a search request including keywords from a user via a user interface. Various search tools and methods may be utilized in accordance with embodiments of the invention, and the invention is not intended to be limited to any particular search tools and methods. In embodiments, the search module 415 of the server 404 implements step 712.

At step 713, the server 404 generates results for the user, based on results from the document analysis process according to embodiments of the invention (e.g., results 614 depicted in FIG. 6), wherein the results may include one or more blocks (e.g., including consolidated blocks) determined by the sever 404. Thus, embodiments of the invention provide an improved search system wherein text blocks containing complete sentences or phrases are provided to the user in response to their search query. It can be understood that such results would be an improvement over other systems producing content blocks with disconnected text, such as the results 610 depicted in FIG. 6.

Figure 8:
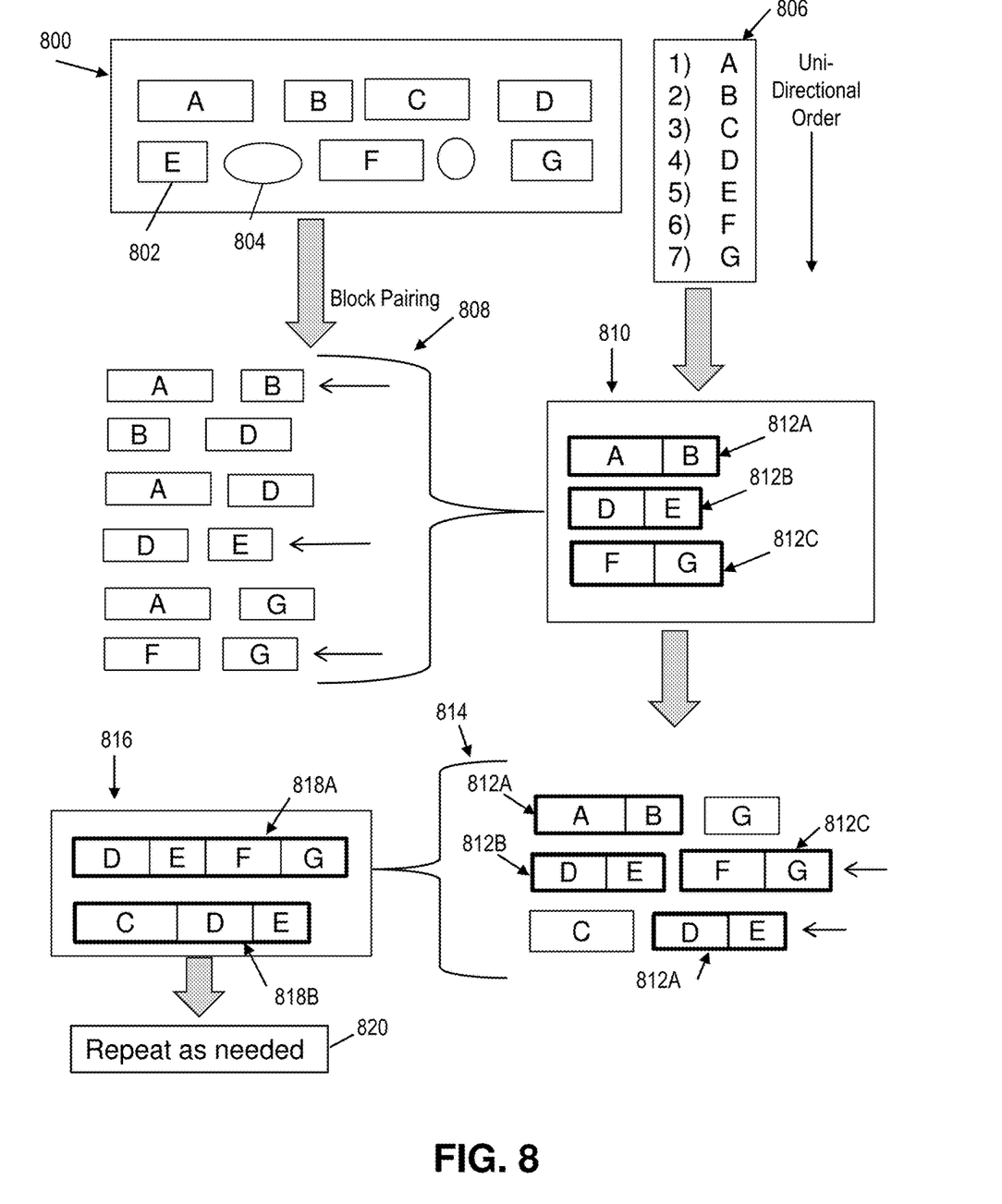
FIG. 8 is a diagram illustrating an exemplary use scenario in accordance with embodiments of the invention.

FIG. 8 is a diagram illustrating an exemplary use scenario in accordance with embodiments of the invention. Method steps represented in FIG. 8 may be carried out in the environment of FIG. 4 based on steps of FIG. 7, and are described with reference to elements depicted in FIG. 4.

In the example of FIG. 8, the server 404 has determined a structure for a document 800, including blocks of text represented by content block 802, and non-text elements (e.g., images) represented at 804. In this example, the server 404 determines a uni-directional order of the blocks of text at 806. The server 404 also determines blocks of text including disconnected text in accordance with step 705 of FIG. 7, and pairs up blocks containing disconnected text according to the directional order 806. Some examples of possible pairings of blocks including disconnected text are represented at 808.

In this example, the server 404 selects pairs to process using NLP based on block pairs that are closest in order according to the directional order 806. In this case, the pairs A/B, D/E and F/G are analyzed by the server 404 using NLP methods, and the server 404 determines that the pairs have text that, when combined in order (e.g., text of A+text of B) results in connected text (e.g., a whole phrase or sentence). The server 404 then consolidates the block pairs at 810 into consolidated blocks 812A, 812B, 812C.

With continued reference to FIG. 8, the server 404 conducts another analysis to determine if any disconnected text remain in the content blocks for the document 800 (including any consolidated blocks). In the example of FIG. 8, pairs of blocks including disconnected text are represented at 814. The server 404 selects pairs to process using NLP based on block pairs that are closest in order according to the directional order 806. In this case, the pairs DE/FG and C/DE are analyzed by the server 404 using NLP methods, and the server 404 determines that the pairs have text that, when combined in order results in connected text (e.g., a whole phrase or sentence). The server 404 then consolidates the block pairs at 816 into consolidated blocks 818A and 818B. At 820, the server 404 iteratively repeats the analysis and block consolidation as needed, until no disconnected text is found in blocks of the document 800.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computing device, a structure of a digital document file using a document understanding analysis, the structure including blocks of content elements having text information;
    determining, by the computing device, for each of the blocks of the digital document file, whether text information in the block is disconnected using artificial intelligence natural language processing;
    determining, by the computing device, an order of the blocks in the digital document file;
    pairing, by the computing device, two blocks from a list of blocks with disconnected text information to form a block pair, wherein the two blocks are ordered based on the determined order of the blocks;
    determining, by the computing device, that the text information of the block pair forms a complete sentence using artificial intelligence natural language processing;

consolidating, by the computing device, the block pair to form a new block, wherein the new block is grammatically correct and comprises a semantic continuity; and generating, by the computing device, an updated document structure for the digital document file based on the document understanding analysis by replacing the two blocks with the block pair.

2. The method of claim 1, further comprising:

determining, by the computing device, for each of the blocks of the digital document file, including the new block, whether text information in the block is disconnected;

determining, by the computing device, a new order of the blocks in the digital document file, including the new block;

pairing, by the computing device, two other blocks from a new list of blocks with disconnected text information to form another block pair, wherein the other two blocks are ordered based on the new order of the blocks;

determining, by the computing device, that the text information of the other block pair forms a complete sentence using artificial intelligence natural language processing; and consolidating, by the computing device, the other block pair to form another new block.

3. The method of claim 1, further comprising:

storing, by the computing device, the updated document structure for the digital document file, the document structure output defining blocks of content.

4. The method of claim 1, further comprising:

determining, by the computing device, geometric information for each of the content elements, wherein the geometric information comprises a position of each content element in the document, a size of each content element in the document, and an order of each content element in the document; and determining, by the computing device, the blocks based on the geometric information for each of the content elements.

5. The method of claim 1, wherein the digital document file is in a portable document format (PDF) format.

6. The method of claim 1, wherein the determining for each of the blocks whether text information in the block is disconnected comprises:

determining, by the computing device, whether a syntax tree comprising can be constructed by performing syntax analysis of text information in the blocks; and determining, by the computing device, that the text information is disconnected in response to determining that a syntax tree cannot be constructed.

7. The method of claim 1, wherein the determining for each of the blocks whether text information in the block is disconnected comprises:

calculating, by the computing device, a probability that words in the text information are arranged adjacent to one another in a sentence by analyzing the text information with a trained language model; and determining, by the computing device, that the text information is disconnected in response to determining that the probability is below a threshold.

8. The method of claim 1, wherein the determining for each of the blocks whether text information in the block is disconnected comprises:

predicting, by the computing device, a probability that words in the text information are arranged adjacent to one another in a sentence by analyzing the text information with a neural network model; and determining, by the computing device, that the text is disconnected in response to determining that the prediction is negative.

9. The method of claim 1, wherein the computing device includes software provided as a service in a cloud environment.

10. A computer program product comprising one or more computer readable storage media having program instructions collectively stored on the one or more computer readable storage media, the program instructions executable by a computing device to:

determine for each of a plurality of blocks in a determined digital document file structure, whether text information in the block is disconnected using natural language processing, wherein the digital document file structure is stored in a data store;

in response to determining that text information in at least some of the blocks is disconnected, pair two blocks from a list of blocks with disconnected text information to form a block pair, wherein the two blocks are ordered based on a determined order of the blocks in the digital document file structure;

determine whether the text information of the block pair forms connected text information using natural language processing;

generate a new block by consolidating the block pair in response to determining that the text information of the block pair form connected text information, wherein the new block is grammatically correct and comprises a semantic continuity;

in response to generating the new block, automatically update the stored digital document file structure by replacing the two blocks with the new block.

11. The computer program product of claim 10, wherein the steps of claim 10 are iteratively repeated until it is determined that, for each of the blocks of the digital document file structure, no text information is disconnected.

12. The computer program product of claim 10, wherein the program instructions are further configured to determine the digital document file structure by:

determining geometric information for each element in a digital document file; and determining the plurality of blocks in the digital document file based on the geometric information for each of the elements.

13. The computer program product of claim 12, wherein the digital document file is in a portable document format (PDF) format.

14. The computer program product of claim 10, wherein the determining for each of the plurality of blocks in the determined digital document file structure, whether text information in the block is disconnected using natural language processing comprises:

determining whether a syntax tree can be constructed by performing syntax analysis of text information in the blocks; and determining that the text information is disconnected in response to determining that a syntax tree cannot be constructed.

15. The computer program product of claim 10, wherein the determining for each of the plurality of blocks in the determined digital document file structure, whether text information in the block is disconnected using natural language processing comprises:

calculate a probability that words in the text information are arranged adjacent to one another in a sentence by analyzing the text information with a trained language model; and determining that the text information is disconnected in response to determining that the probability is below a threshold.

16. The computer program product of claim 10, wherein the determining for each of the plurality of blocks in the determined digital document file structure, whether text information in the block is disconnected using natural language processing comprises:

predict a probability that words in the text information are arranged adjacent to one another in a sentence by analyzing the text information with a neural network; and in response to determining that the prediction is negative, determining that the text is disconnected.

17. A system comprising:

a processor, a computer readable memory, one or more computer readable storage media, and program instructions collectively stored on the one or more computer readable storage media, the program instructions executable to cause a computing device to:

determine for each of a plurality of blocks in a determined digital document file structure, whether text information in the block is disconnected using natural language processing, wherein the digital document file structure is stored in a data store;

in response to determining that text information in at least some of the blocks is disconnected, pair two blocks from a list of blocks with disconnected text information to form a block pair, wherein the two blocks are ordered based on a determined order of the blocks in the digital document file structure;

determine whether the text information of the block pair forms connected text information using natural language processing;

generate a new block by consolidating the block pair in response to determining that the text information of the block pair form connected text information, wherein the new block is grammatically correct and comprises a semantic continuity;

in response to generating the new block, automatically update the stored digital document file structure by replacing the two blocks with the new block;

iteratively repeating the steps of determining whether text information in the block is disconnected, pairing two blocks, determining whether the text information of the block pair forms connected text information, generating a new block, and updating the stored structure, until the computing device determines that, for each of a plurality of blocks in a determined digital document file structure, no text information is disconnected, wherein updating the stored structure comprises replacing the two blocks with the block pair.

18. The system of claim 17, wherein the determining for each of the plurality of blocks in the determined digital document file structure, whether text information in the block is disconnected using natural language processing comprises:

determining whether a syntax tree can be constructed by performing syntax analysis of text information in the blocks; and determining that the text information is disconnected in response to determining that a syntax tree cannot be constructed.

19. The system of claim 17, wherein the determining for each of the plurality of blocks in the determined digital document file structure, whether text information in the block is disconnected using natural language processing comprises:

calculate a probability that words in the text information are arranged adjacent to one another in a sentence by analyzing the text information with a trained language model; and determining that the text information is disconnected in response to determining that the probability is below a threshold.

20. The system of claim 17, wherein the determining for each of the plurality of blocks in the determined digital document file structure, whether text information in the block is disconnected using natural language processing comprises:

predict a probability that words in the text information are arranged adjacent to one another in a sentence by analyzing the text information with a neural network; and in response to determining that the prediction is negative, determining that the text is disconnected.

* * * * *